United States Patent [19]

Junghanss et al.

[11] 4,008,076
[45] Feb. 15, 1977

[54] METHOD FOR PROCESSING MANGANESE NODULES AND RECOVERING THE VALUES CONTAINED THEREIN

[75] Inventors: Helmut Junghanss; Wilhelm Roever, both of Duisburg; Dieter Neuschütz, Kettwig; Ulrich Scheffler, Essen, all of Germany

[73] Assignees: Duisburger Kupferhutte, Duisburg; Fried. Krupp Gesellschaft mit beschrankter Haftung, Essen, both of Germany

[22] Filed: Jan. 15, 1976

[21] Appl. No.: 649,491

[30] Foreign Application Priority Data

Jan. 15, 1975 Germany .......................... 2501284

[52] U.S. Cl. ........................ 75/101 R; 75/101 BE; 75/115; 75/117; 75/119; 75/120; 423/23; 423/27; 423/36; 423/100; 423/106; 423/107; 423/139; 423/146; 423/147; 204/108

[51] Int. Cl.² .................. C22B 15/08; C22B 19/22; C22B 23/04

[58] Field of Search ........... 75/115, 101 R, 101 BE, 75/117, 119, 120, 121; 423/23, 27, 36, 100, 106, 107, 139, 146, 147; 204/108

[56] References Cited

UNITED STATES PATENTS

| | | | |
|---|---|---|---|
| 2,842,427 | 7/1958 | Reynaud et al. | 75/119 X |
| 2,971,836 | 2/1961 | Hall | 75/119 |
| 2,992,894 | 7/1961 | Hazen et al. | 75/120 X |
| 3,244,513 | 4/1966 | Zubryckyj et al. | 75/119 |
| 3,322,532 | 5/1967 | Wieder | 75/108 |
| 3,479,378 | 11/1969 | Orlandini et al. | 75/120 X |
| 3,795,596 | 3/1974 | Kane et al. | 204/105 M |
| 3,809,624 | 5/1974 | Kane et al. | 204/108 X |
| 3,810,827 | 5/1974 | Kane et al. | 204/105 M |
| 3,869,360 | 3/1975 | Kane et al. | 204/108 X |
| 3,923,615 | 12/1975 | Kane et al. | 75/121 X |

*Primary Examiner*—G. Ozaki
*Attorney, Agent, or Firm*—Spencer & Kaye

[57] ABSTRACT

A method is provided for processing raw manganese nodules for the selective recovery of metal values of nickel, copper, cobalt and zinc contained therein by hydrometallurgical means. The raw nodules are suspended in water or dilute wash solution to form a suspension. The suspension and sulfuric acid are charged to a pressure vessel to provide a solid-liquid suspension of nodules and leach solution. The solid-liquid suspension of nodules and leach solution is heated in the pressure vessel to a temperature between about 150° C and about 300° C to cause the nickel, copper, cobalt and zinc to be selectively leached from the nodules into the leach solution to form a metal rich leach solution containing these metals and a residue, with the solid-liquid suspension having a sulfuric acid content of less than 35 g/l upon completion of the leaching. The metal rich leach solution containing nickel, copper, cobalt and zinc is separated from the residue. The nickel, copper, cobalt and zinc values are then recovered from the separated metal rich leach solution.

28 Claims, 3 Drawing Figures

METHOD FOR PROCESSING MANGANESE NODULES AND RECOVERING THE VALUES CONTAINED THEREIN

BACKGROUND OF THE INVENTION

The present invention relates to a method for processing manganese nodules and, more particularly, relates to a method for selective recovery of nickel, copper, cobalt and zinc values contained therein, by predominantly hydrometallurgical means.

Ocean floor nodules containing significant quantities of metal have been viewed as a source for a number of the metals contained therein. The nodules generally contain manganese, iron, copper, nickel, cobalt, zinc, molybdenum, aluminum, magnesium, alkali, and other components, such as clay minerals. Manganese can be present in the nodules generally in an amount of from 10 to 40 weight percent and the nodules have come to be referred to as manganese nodules. Of the many ingredients in the nodules, nickel, copper and cobalt recovery have received major attention as providing an economical source of these metals. In addition, zinc and molybdenum recovery have received attention as providing an economical source of these metals. The nodules generally have not been considered as an economical source of the other metals, and methods have been devised to separate the nickel, copper, cobalt, zinc, and molybdenum from the other components of the nodules.

Since manganese nodules differ considerably in their mineralogical structure and chemical composition from all previously smelted ores, it is not possible to refer to a known ore smelting process for the metallurgical processing of such nodules. Preconcentration of the values by physical processing methods is impossible according to present experience i.e., the manganese nodules must be smelted without being enriched.

Several processes for recovering the values contained in manganese nodules are known. Beck and Messner, in *Copper Metallurgy*, 1970, pages 70 to 82, examine melting of manganese nodules in an electric arc furnace under reducing conditions with simultaneous slag formation of the manganese. The disadvantage in this process is that an alloy is formed which consists of iron, cobalt, nickel and copper and this alloy is difficult to separate into its individual components.

In other known processes, the manganese nodules are decomposed by sulfate forming roasting or chlorination with gaseous chlorine and/or hydrogen chloride and are then dissolved by leaching with water or diluted sulfuric acid. See, for example, U.S. Bureau of Mines, Rept. Invest. 7473, and German Offenlegungsschrift No. 2,126,175 and the substantially corresponding British Pat. No. 1,347,715. These processes have the disadvantage that the less valuable manganese is also dissolved and must thus be recovered which, in the end, involves undesirably high process costs and technically complicated process stages.

It has also been proposed to selectively reduce the copper, nickel and cobalt contained in the manganese nodules in a first process stage with reduction gas, oil or carbon and to subsequently treat the reduction products in the presence of air with an aqueous ammoniacal-ammonium salt solution thus forming water soluble amine complexes of copper, nickel and cobalt. See, for example, German Offenlegungsschrift Nos. 2,135,733, 2,135,734 and 2,247,497, and the substantially corresponding U.S. Pat. Nos. 3,753,686, 3,734,715 and 3,788,841, respectively. In U.S. Pat. No. 3,728,105, there is disclosed a process in which the manganese nodules are subjected directly to an ammoniacal pressure leaching at 300° C. These processes which operate with ammonia have the disadvantage that complicated process stages are required to circulate the ammonia and to obtain high yields in values.

According to a proposal made in German Offenlegungsschrift No. 2,135,732, and the substantially corresponding U.S. Pat. No. 3,723,095, the manganese nodules are treated at temperatures up to 60° C with an ammoniacal manganese (II) sulfate solution whereby the values which form water soluble amine complexes are separated from the iron and manganese compounds. The drawback of this process is that it is necessary to continuously produce new manganese (II) sulfate and introduce it into the process.

SUMMARY OF THE INVENTION

The present invention relates to a process with which it is possible to continuously obtain copper, nickel, cobalt and zinc from manganese nodules with high selectivity against iron and manganese and with high yield. The present invention uses technically simple and economical operating means and enables extensive recirculation of energy and chemicals. In the present invention, the waste products are obtained as nonpolluting compounds.

The present invention, as embodied and broadly described, provides a method for processing raw manganese nodules for the selective recovery of metal values of nickel, copper, cobalt and zinc contained therein, by predominantly hydrometallurgical means, and comprises the steps of: suspending the crushed raw nodules in water or dilute wash solution to form a suspension; charging the suspension and sulfuric acid to a pressure vessel to provide an acidified solid-liquid suspension; heating that solid-liquid suspension to a temperature between about 150° C and about 300° C to cause the nickel, copper, cobalt and zinc to be selectively leached from the nodules to form a metal rich leach solution containing these metals and a residue, with the solid-liquid suspension having a sulfuric acid content of less than 35 g/l upon completion of the leaching; separating the metal rich leach solution containing nickel, copper, cobalt and zinc from the residue; and recovering the nickel, copper, cobalt and zinc values from the separated metal rich leach solution.

Preferably, the recovery of the copper from the separated metal rich leach solution comprises contacting the separated metal rich leach solution with a copper specific organic solvent extractant to form an organic phase containing the copper and an aqueous raffinate, and separating the organic phase from the aqueous raffinate. The separated aqueous raffinate can then be treated to recover the nickel, cobalt and zinc values. In one embodiment for treating the raffinate, hydrogen sulfide is introduced into the raffinate at a pH of between about 0.5 and 2.5, at a temperature of between about 50° C and 150° C, and at a pressure of between about 2 and 20 atmospheres, to precipitate the sulfides of nickel, cobalt and zinc from the raffinate, and the precipitate is filtered out and dissolved in dilute hydrochloric acid at a temperature of between 50° C and 100° C. The nickel, cobalt and zinc can then be recovered from the resulting hydrochloric acid solution. Solvent extraction can be used for this recovery.

In an alternate embodiment of treating the separated aqueous raffinate, the raffinate is passed over a selectively acting fixed-bed cation exchanger to separate nickel, cobalt and zinc from the raffinate phase and fix them to the exchanger while forming a waste solution, and then the charged exchanger is eluted with dilute hydrochloric acid to form an eluate containing nickel, cobalt and zinc. The nickel, cobalt and zinc can then be recovered from the eluate. The eluate can be subjected to hydroxide precipitation or solvent extraction to recover the metal values.

Additional advantages of the present invention will be set forth in part in the description which follows and in part will be obvious from the description or can be learned by practice of the invention. The advantages are achieved by means of the processes, instrumentalities and combinations particularly pointed out in the appended claims.

BRIEF DESCRIPTION OF THE DRAWINGS

The accompanying drawings, in which like numbers indicate like parts, illustrate examples of presently preferred embodiments of the invention and, together with the description, serve to explain the principles of the invention.

Of the drawings.

DETAILED DESCRIPTION OF THE INVENTION

Manganese nodules as recovered from the ocean floor vary considerably in size, and can range from about 0.5 cm to as large as 25 cm in diameter and generally average about 3 cm in diameter. In the practice of the present invention, it is preferred to reduce the as received nodules to smaller and more uniform size distribution to increase the recovery of the metal values. Generally, the nodules are comminuted as by grinding or crushing to a particle size of less than 10 mm, and preferably to a particle size between 0.5 mm and 2.0 mm.

After the nodules have been ground to a particle size of less than 10 mm, they are suspended in water or dilute wash solution to form a suspension. Generally, enough water or dilute wash solution is added to the ground nodules to form a pumpable suspension, with the suspension generally containing 20 to 50 weight percent of nodules.

The water suspension of nodules and sulfuric acid are charged to a pressure vessel to provide an acidified solid-liquid suspension. The solid-liquid suspension is heated in the pressure vessel to bring about a reaction and effect a pressure leaching in which the nickel, copper, cobalt and zinc values are selectively leached and substantially all go into solution as does in part the aluminum, magnesium and alkali content, while the manganese and iron content of the nodules remains mainly undissolved as a residue. The pressure leaching generally takes place at temperatures between about 150° C and about 300° C, preferably at 200° C, and generally requires retention times between about 30 minutes and about 4 hours. The quantity of sulfuric acid used in the pressure leaching is measured so that upon completion of the leaching process, the residual acid content in the resulting final liquid-solid suspension is a maximum of 35 g $H_2SO_4$/l, preferably 8 to 15 g $H_2SO_4$/l. Per dry metric ton of manganese nodules about 300 kg to 500 kg of concentrated sulfuric acid have to be added preferably by direct injection into the leaching autoclaves.

According to the present invention the crushed manganese nodules are leached without any chemical pretreatment operation like prereduction, chlorination or sulfating roasting. Besides sulfuric acid no chemical reagents are needed, especially no gases, so that the pressure in the autoclave corresponds to the water vapor pressure at the selected leaching temperature. A significant characteristic of the leaching process according to the present invention is, that despite of the lack of pretreatment procedures, the nickel, copper, cobalt and zinc values are extracted with high yields and selectivity.

Figure 1:
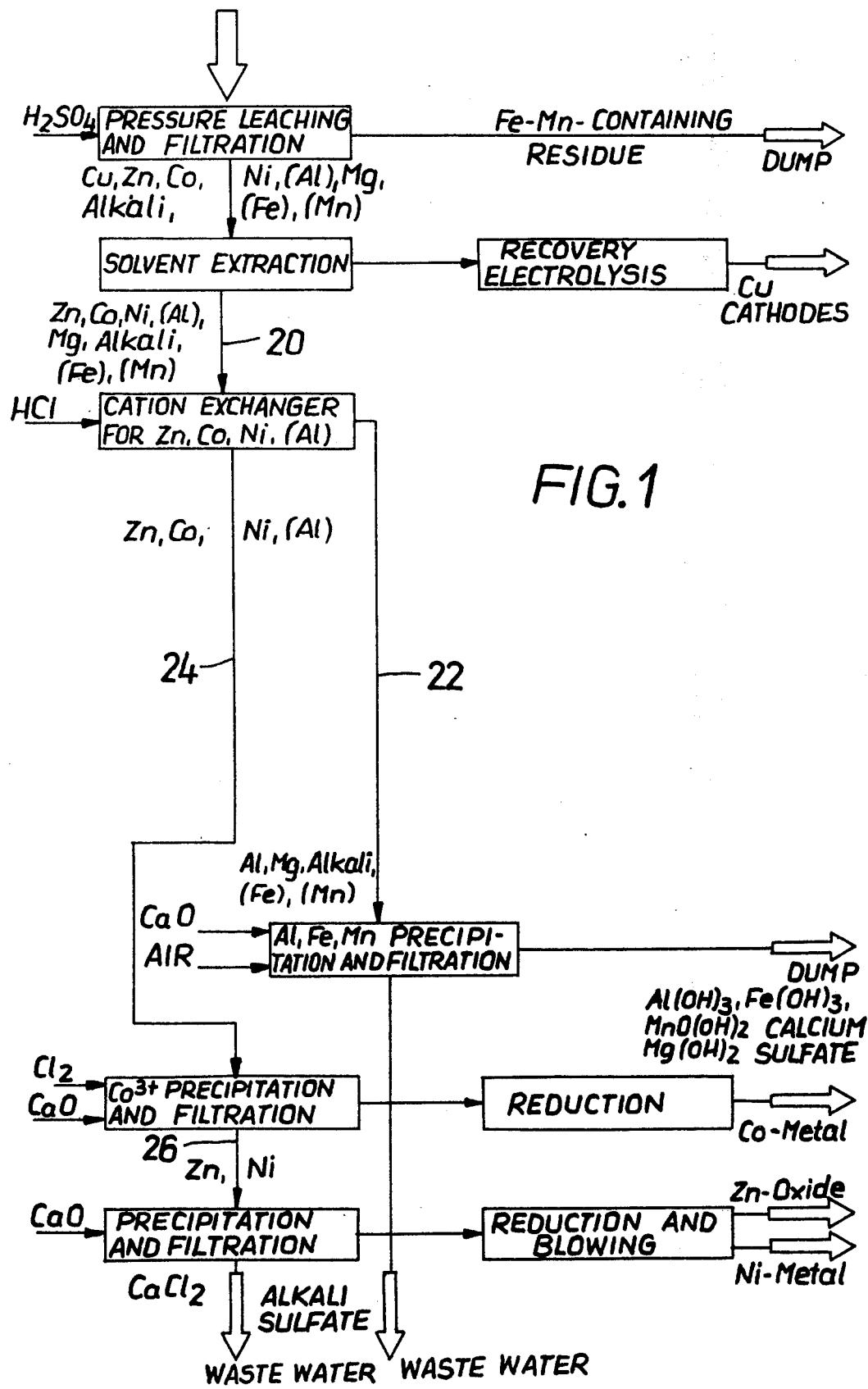
FIG. 1 is a schematic drawing showing a flow diagram of one embodiment of a process scheme in accordance with the teachings of the present invention.

After leaching, as shown in FIG. 1, the residue which contains the major portion of the manganese and iron present in the manganese nodules is separated from the metal rich leach liquor in a convenient manner such as by way of filtration. The separated residue can then be washed with water and the washed residue can then be discarded or dumped. It is here advisable to initially indirectly cool the hot suspension coming from the leaching process, preferably to about 130° C, and then to bring about further cooling by flash evaporation (direct cooling). The heat released during the indirect and direct cooling of the hot suspension can be utilized to pre-heat the manganese nodule suspension entering the leaching process and/or in subsequent process steps. Preferably, the dilute wash solution obtained from washing the residue produced during the pressure leaching process, is used, either wholly or in part, for mixing with the ground manganese nodules to produce the pumable suspension which is fed to the pressure vessel tank for leaching.

The metal rich leach solution obtained during pressure leaching contains copper, cobalt, nickel and zinc, and after it is separated from the residue, the nickel, copper, cobalt and zinc values are recovered from it. To effect recovery of these metals, the copper is selectively extracted in the next process step. This is done by a copper specific solvent extraction with an organic compound. For example, oximes or derivatives of 8-hydroxyquinoline can be used to extract the copper from the metal rich leach solution into the organic extractant. Suited organic reagents, some of which have been applied in commercial scale copper extraction plants, are the LIX reagents, produced by General Mills Chemicals Inc., and the Kelex reagents, produced by Ashland Chemicals Co..

The copper laden organic extractant is then separated from the metal rich leach solution leaving an aqueous raffinate phase containing the nickel, cobalt and zinc. The copper in the separated organic phase can then be recovered by re-extracting it from the organic phase with sulfuric acid. The resultant aqueous copper containing sulfuric acid solution can then be fed to an electrolysis cell for electrolytic reduction to obtain pure copper at the cathode.

After the separation of the copper from the metal rich leach solution, the resulting aqueous raffinate phase is treated to recover the nickel, cobalt and zinc.

One embodiment of a method for treating the raffinate phase is illustrated in FIG. 1, and as can be seen, the raffinate, in line 20, is charged into a selectively acting fixed-bed cation exchanger which contains, for example, amino carbon or iminodicarbon acid groups to fix nickel, cobalt, zinc and part of the aluminum thereon.

The raffinate stream leaves the fixed-bed cation exchanger as an effluent solution stream 22 which contains the major portion of the aluminum, all of the magnesium and the alkalis as well as the small quantities of iron and manganese which went into solution during the leaching process. To purify the effluent solution, stream 22, this stream is treated with air and milk of lime with a pH of 7 to 10 being set to form a residue precipitate which contains iron hydroxide, manganese hydroxide, aluminum hydroxide and magnesium hydroxide. This residue is separated from the stream as by filtration, and the separated residue can then be dumped or discarded. The filtered aqueous solution can then be discarded as a waste water without fear of contaminating the stream it is dumped into with heavy metals.

After the raffinate stream 20 passes through the fixed-bed cation exchanger and leaves as an effluent stream 22, the now charged fixed-bed cation exchanger is eluted with dilute hydrochloric acid to form an eluate stream 24 containing zinc, cobalt and nickel, as well as some aluminum. The concentration of the dilute hydrochloric acid used preferably is between 5 and 20 weight percent HCl. The hydrochloric acid eluate can then be treated to recover the cobalt, zinc and nickel. In one method for treating this eluate, as shown in FIG. 1, cobalt (III) hydroxide is precipitated from the eluate by simultaneously introducing into the eluate gaseous chlorine and milk of lime, preferably at a pH of 3.8 to 4.0. The precipitated cobalt (III) hydroxide is separated from the eluate, is thereafter calcined, and finally is reduced to cobalt. During the precipitation of cobalt (III) hydroxide, aluminum hydroxide is simultaneously precipitated, and this aluminum hydroxide is separated and calcined with the cobalt (III) hydroxide.[1] During the reduction of the cobalt (III) hydroxide, the aluminum hydroxide is made into slag.

[1]The reduction of the cobalt (III) hydroxide can be performed pyrometallurgically in an electric furnace by means of coke.

The solution which remains after the cobalt and aluminum precipitation and removal is shown as stream 26 in FIG. 1, and contains nickel and zinc. Stream 26 is subjected to a complete precipitation with milk of lime, preferably at a pH of 6.5 to 8, to form a precipitated hydroxide mixture of zinc and nickel hydroxides. The precipitated hydroxide mixture is separated from stream 26, and the separated hydroxide mixture can then be calcined and processed, for example, in an electroreduction furnace to produce pure nickel and pure zinc oxide in the form of flue dust, which is collected in filter bags and can be marketed. Pure zinc metal can be obtained from the zinc oxide by redissolution in sulfuric acid and subsequent electrowinning. The stream remaining after precipitation and removal of the precipitated hydroxides is a waste stream and can be discharged without any undue contaminating effects.

It may be advisable, under certain circumstances, in order to increase the pH during the various precipitation processes described above, to use other base reagents instead of milk of lime, such as magnesium oxide or alkali compounds.

Figure 2:
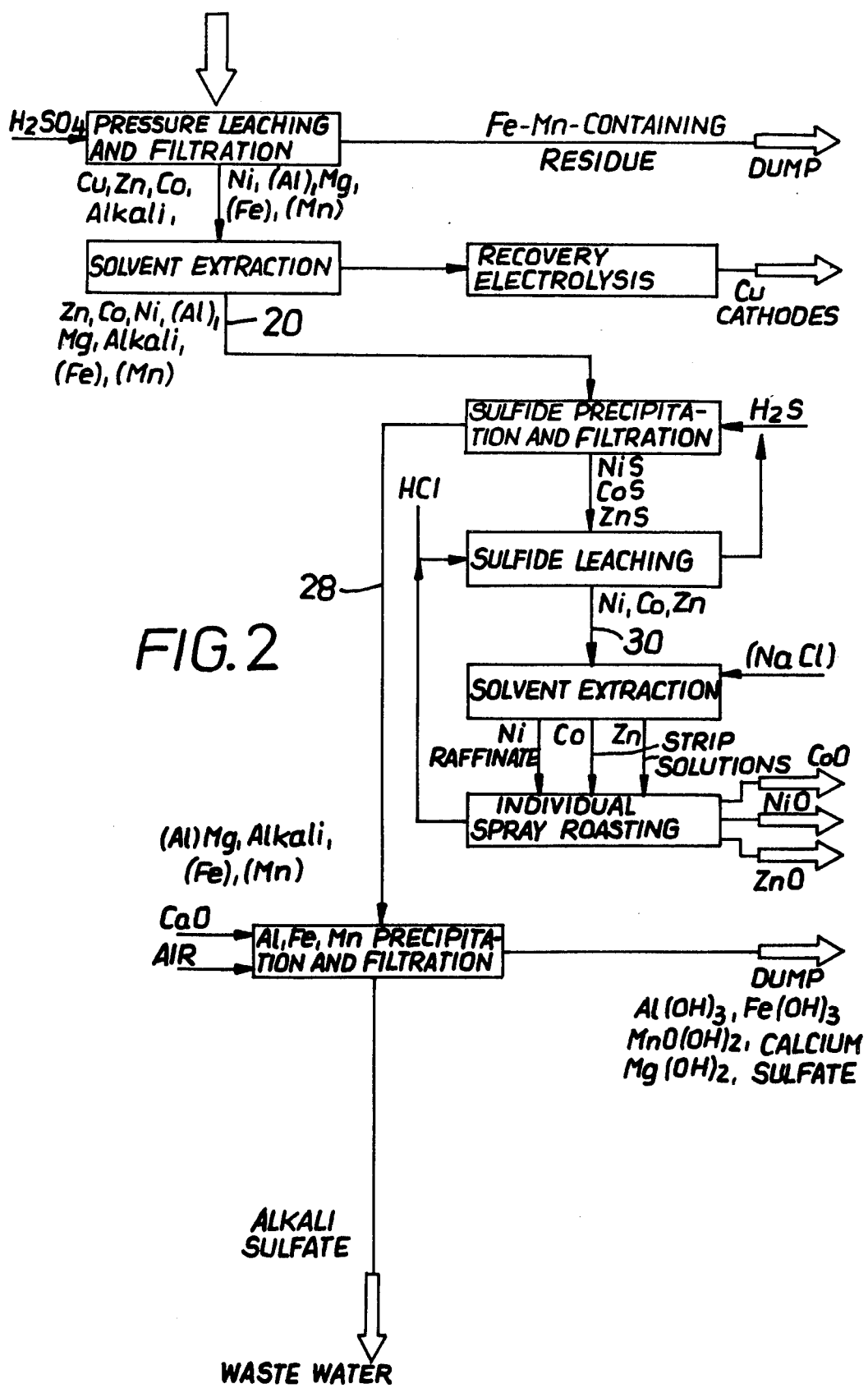
FIG. 2 is a schematic drawing showing a flow diagram of a second embodiment of a process scheme in accordance with the teachings of the present invention.

In an alternate embodiment of the present invention for separating the values nickel, cobalt and zinc from the impurities in the copper free aqueous raffinate 20, hydrogen sulfide to which up to about 20% of volume hydrogen may be added is introduced into the raffinate to form precipitates of the sulfides of nickel, cobalt and zinc, as shown in FIG. 2. The hydrogen sulfide is introduced at a pH of the solution of 0.5 to 2.5, preferably 1.5, a temperature of 50° C to 150° C, preferably 120° C and a pressure of 2 to 20 atmospheres. The addition of hydrogen to the hydrogen sulfide used for precipitation, facilitates the subsequent redissolution of the metal sulfides in hydrochloric acid. The metal sulfide precipitates then are filtered out and subjected to sulfide leaching by being dissolved in dilute hydrochloric acid at a temperature of 50° C to 100° C, preferably 90° C to form a hydrochloric acid solution 30 which contains the nickel, cobalt and zinc. The dilute hydrochloric acid, used for the redissolution of the mixed sulfide precipitate, preferably contains about 200 g/l HCl. This concentration, close to azeotropic $HCl/H_2O$-composition, enables economic HCl-recovery from the chloridic solution remaining after the separation of nickel, cobalt and zinc, and on the other hand yields chloride ion concentrations in the hydrochloric acid leach liquor, which are high enough to enable extraction of cobalt and zinc selectively to nickel by use of tertiary amines. Upon introduction of the dilute HCl, hydrogen sulfide is formed and this hydrogen sulfide can be used again for the sulfide precipitation taking place in the preceding step. The filtrate 28 formed upon filtering out the metal sulfide precipitates now contains the major portion of the aluminum, all of the magnesium and the alkalis as well as small quantities of iron and manganese which went into solution during the leaching process. This stream 28 is then purified in the same manner as stream 22 as described above in connection with the embodiment of FIG. 1.

Figure 3:
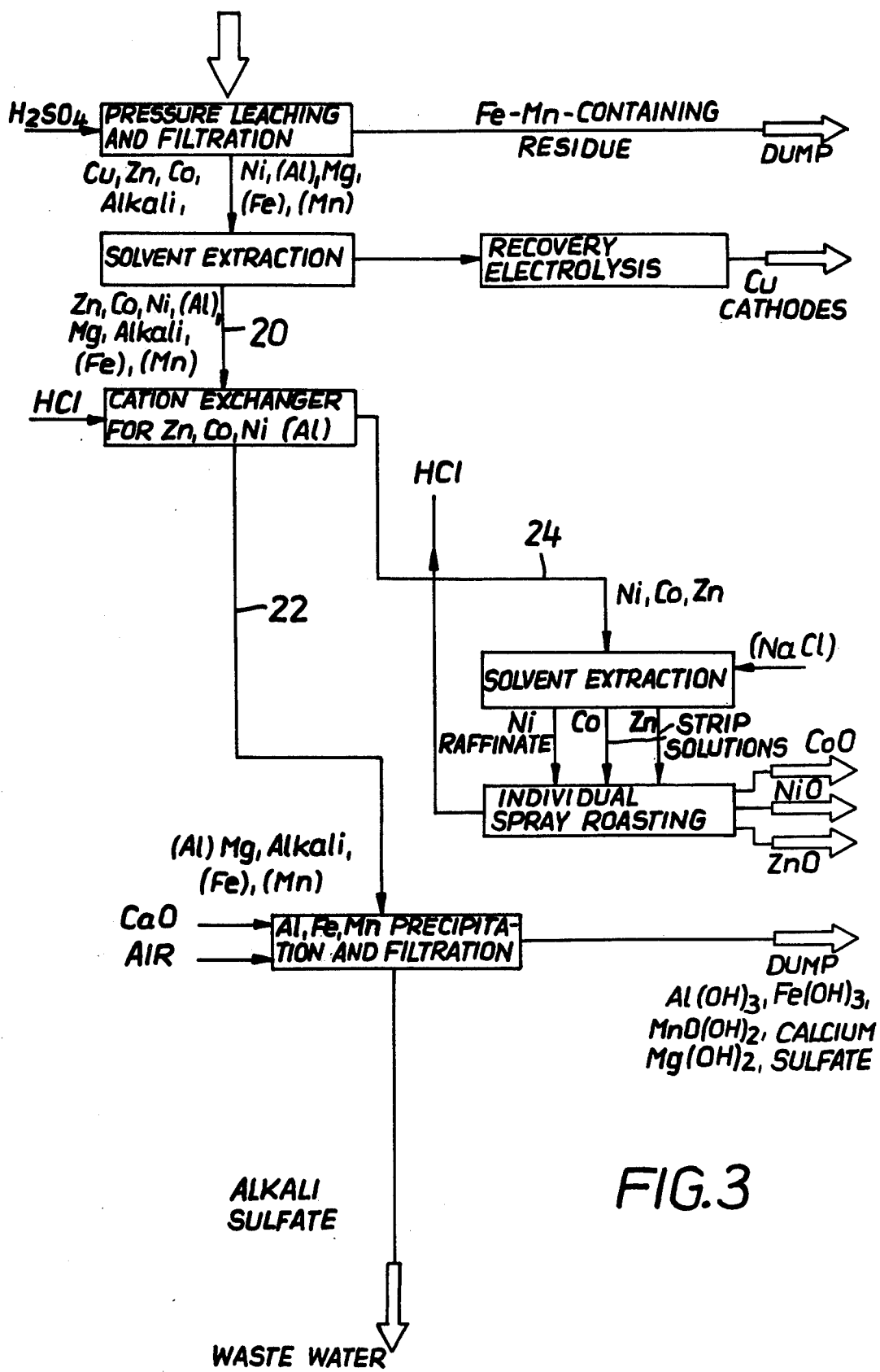
FIG. 3 is a schematic drawing showing a flow diagram of a third embodiment of a process scheme in accordance with the teachings of the present invention.

In a further embodiment of the invention for the selective recovery of the values nickel, cobalt and zinc, after separation of the copper, the above-mentioned values are separated from the hydrochloric acid eluate 24 of the fixed-bed cation exchanger as shown in FIG. 3, or from the hydrochloric acid solution 30 obtained upon dissolution of the sulfides, as shown in FIG. 2, respectively, by organic solvent extraction, possibly with addition of sodium chloride. Examples of suitable solvent extractants are tributyl phosphate and tertiary amines like triisooctylamine and triisononylamine. Tributyl phosphate can be used for the selective extraction of zinc. Tertiary amines can be used either for the selective extraction of cobalt after zinc has been extracted with tributyl phosphate, or as an alternative route, for the common extraction of zinc and cobalt without preceeding zinc extraction by tributyl phosphate. In either case the nickel content in the hydrochloric acid eluate of the fixed-bed cation exchanger, stream 24 in FIG. 3, or the nickel content of the hydrochloric acid solution, stream 30 in FIG. 2, obtained upon redissolution of the precipitated sulfides, remains in the zinc and cobalt free raffinate. The separation of zinc and cobalt from nickel by use of tributyl phosphate or tertiary amines as solvent extractants is based on the fact that in strong chloride solutions cobaltous ions and zinc ions form anionic chloride complexes which can be extracted by an anion exchange solvent, while the nickel cations remain uncomplexed and hence are not extracted. The necessary chloride ion concentrations of about 3 to about 5 moles per liter can be adjusted by equivalent concentrations of the hydrochloric acid, used for elution of the fixed-bed cation exchanger or used for redissolution of precipitated sulfides, or alternatively by addition of sodium chloride.

If zinc and cobalt are selectively extracted, the individual chloride solutions, formed when stripping the zinc loaded tributyl phosphate and the cobalt loaded tertiary amine with water or dilute hydrochloric acid, can be spray roasted so that the pure oxides of zinc and cobalt are obtained. Preferably, when the zinc content of the manganese nodules is low, zinc and cobalt are extracted together by the use of tertiary amines and converted to a mixed oxide by spray roasting the chloridic strip solution. The zinc and cobalt containing mixed oxide is processed, for example, in an electroreduction furnace to pure cobalt metal and pure zinc oxide. This oxide is collected in filter bags in the form of flue dust. After the zinc and cobalt separation, the nickel can be recovered from the resulting aqueous raffinate of the cobalt and zinc extraction by precipitation with milk of lime. Alternatively, the nickel containing chloride solution can be subjected to spray roasting in which nickel oxide and possibly sodium chloride are produced. The sodium chloride can be dissolved in water and returned to the process. During the various spray roasting operations, hydrogen chloride is given off which is recovered for reuse in the process.

With the method of the present invention, which is easily adapted to the known significant fluctuations in the composition of the manganese nodules, a number of significant advantages are realized compared to the known processes.

The sulfuric acid pressure leaching dissolves the values nickel, copper, cobalt and zinc at high yields while the worthless accompanying elements substantially remain in the residue. The but slight amounts of contaminants in the resulting solution in the form of iron and manganese permit very economical recovery of the values in the subsequent process stages. The solvent extraction and subsequent reduction electrolysis yield copper in the shortest possible process sequence and in high purity. The use of the fixed-bed cation exchanger substantially separates the contaminants and increases the concentrations of the values nickel, cobalt and zinc by a factor of about 5 to about 15 so that the individual separating operations can be performed with correspondingly small volumes or apparatuses.

The residue obtained in the pressure leaching process is present in a well settling and easily washable form and can be nonpollutingly discarded in the same manner as the residue obtained in the precipitation of the value-free eluate of the fixed-bed cation exchanger. The resulting waste water contains no heavy metals and does not stress the oxygen balance of the receiving stream.

The alternative use of hydroxide precipitation, sulfide precipitation or solvent extraction gives the process of the present invention added flexibility.

In the following examples some typical experimental results of manganese nodule processing according to the present invention are given.

Table I:

| Composition of tested pacific manganese nodules | |
|---|---|
| | weight % in dry nodule |
| Ni | 1.1 |
| Cu | 0.94 |
| Co | 0.23 |
| Zn | 0.18 |
| Mn | 21.9 |
| Fe | 6.9 |

Table II:

| Particle size distribution of crushed manganese nodules used for sulfuric acid pressure leaching | |
|---|---|
| size range mm | cumulative weight-% |
| + 0.05 | 92 |
| + 0.1 | 85 |
| + 0.2 | 68 |
| + 0.3 | 62 |
| + 0.5 | 45 |
| + 0.8 | 31 |
| + 1.0 | 21 |
| + 1.2 | 11 |
| + 1.5 | 4 |
| + 2.0 | 2 |

Example I:

Pressure leaching of manganese nodules with sulfuric acid

| composition of nodule/acid-suspension manganese nodules | dilute volume | sulfuric acid concentration | temperature | leaching time | Ni | Cu | dissolved portion Co | Zn | Mn | Fe | free acid content of leach solution | weight of leach residue |
|---|---|---|---|---|---|---|---|---|---|---|---|---|
| g | ml | g/l H$_2$SO$_4$ | °C | hours | % | | | | | | g/l H$_2$SO$_4$ | g |
| 200 | 1000 | 70 | 200 | 3 | 92 | 91 | 46 | 85 | 3.7 | 1.7 | 25 | 155 |
| 200 | 1000 | 80 | 200 | 3 | 93 | 92 | 66 | 90 | 4.7 | 2.4 | 30 | 148 |
| 200 | 1000 | 90 | 200 | 3 | 95 | 96 | 77 | 97 | 6.1 | 5.1 | 35 | 143 |
| 200 | 1000 | 70 | 200 | 1.5 | 81 | 80 | 25 | 84 | 3.1 | 1.7 | 28 | 147 |
| 200 | 1000 | 70 | 250 | 1.5 | 90 | 88 | 65 | 89 | 4.7 | 1.5 | 16 | 154 |
| 200 | 1000 | 74 | 250 | 1.5 | 91 | 90 | 70 | 90 | 4.5 | 2.0 | 20 | 153 |

Example II:

Solvent extraction of copper from sulfuric acid leach liquor in a 3 stage mixer-settler apparatus composition of aqueous solution:

| Cu | Ni | Co | Mn | Fe | Mg | Al | Ca | Na | K | free H$_2$SO$_4$ |
|---|---|---|---|---|---|---|---|---|---|---|

Example II:-continued

Solvent extraction of copper from sulfuric acid leach liquor in a 3 stage mixer-settler apparatus composition of aqueous solution:

| g/l | 4.0 | 4.5 | 0.32 | 5.9 | 0.6 | 7.9 | 1.4 | 0.2 | 7.5 | 2.0 | 15.4 |
|---|---|---|---|---|---|---|---|---|---|---|---| organic extractant:
30 Vol.-% LIX-73 in kerosene, stripped to 1.6 g/l copper content

| | |
|---|---|
| flow rate ratio aqueous to organic | : A : 0 =1 : 1 |
| mixing time (per stage) | : 3.7 minutes |
| settling time (per stage) | : 15 minutes |
| copper content in aqueous raffinate | : 0.16 g/l |
| extracted copper portion | : 96 % |

Example III:

Mixed sulfide precipitation with hydrogen sulfide and redissolution in hydrochloric acid Test solution:

1.5 l copper free raffinate containing 4.29 g/l Ni, 0.42 g/l Co, 0.4 g/l Zn, 5.67 g/l Mn, 0.58 g/l Fe precipitation:

| | | | |
|---|---|---|---|
| pH of copper free solution | | 2.0 | 1.5 |
| temperature | °C | 120 | 120 |
| partial pressure $H_2S$ | atm | 7 | 7 |
| partial pressure $H_2$ | atm | 2 | 2 |
| retention time | min | 45 | 45 |
| precipitated portions | % Ni | 99.8 | 99.7 |
| | % Co | >99.9 | >99.9 |
| | % Zn | >99.9 | >99.9 |
| | % Mn | 0.1 | <0.1 |
| | % Fe | 7.6 | 1.9 |
| Ni/Co-Content of end solution | g/l Ni | 0.007 | 0.008 |
| | g/l Co | <0.001 | <0.001 | redissolution:

| | | | |
|---|---|---|---|
| dilute hydrochloric acid | ml | 250 | 125 |
| | g/l HCl | 200 | 200 |
| temperature | °C | 90 | 90 |
| leaching time | hours | 3 | 3 |
| solubilized portion | % Ni | 99.3 | 98.9 |
| | % Co | 98.4 | 97.5 |
| | % Zn | >99.9 | 99.9 |
| leach liquor composition | g/l Ni | 24.4 | 46.2 |
| | g/l Co | 2.1 | 4.1 |
| | g/l Zn | 2.9 | 5.9 |
| | g/l Mn | 0.03 | 0.06 |
| | g/l Fe | 0.05 | 0.1 |

EXAMPLE IV

For separating the metal values of Co, Ni and Zn, a sulphate solution composed, in g/l, of 5.1 Ni, 0.7 Co, 0.6 Zn, 1.2 Al, 5.4 Mn, 0.3 Fe, 0.4 Ca, 7.1 Mg as well as approximately 1 K and 8 Na is passed over 1 l of an ion-exchanger with a complex-forming resin. The cation exchanger of the type Lewatit TP 207, manufactured by Farbenfabriken Bayer, Leverkusen, West Germany, has a macroporous structure and iminodiacetic acid as active groups which were previously converted into sodium salt by treatment with a dilute solution of caustic soda.

Having a pH-value of 2.5-3.0 the solution flows at approximately 60° C through the exchanger at a specific load of 4 l/h/l of resin volume. The liquid effluent from the exchanger is free from the metals values to be separated until cobalt breaks through after 5.0 to 5.2 l, i.e. until its presence can be verified in the effluent. The exchanger resin is chiefly charged with Ni, Co, Zn, as well as Al and is subsequently washed with slightly acid water in order to displace the solution from the resin bed. The charged ion exchanger is then eluted with a 2.5-3.0 M HCl solution. Two volume parts of eluate contain 12.8 g/l Ni, 1.7 g/l Co, 1.45 g/l Zn and 2.95 g/l Al, as well as small amounts of Fe and Mn (less than 5% of the inflow).

The separating effect can be improved by a two-stage procedure using two resin exchangers. The solution flows through both resin exchangers until Co appears in the effluent from the second exchanger. The first exchanger is then cut out, washed and eluted; the metallic solution is then filtered via the second and an additional third resin exchanger, and the process continued according to this principle.

EXAMPLE V

From a hydrochloric solution composed, in g/l, of 46.2 Ni, 4.1 Co, 5.6 Zn, 0.1 Fe and 0.06 Mn, Zn is separated by extracting the $ZnCl_2$ with TBP (tributyl phosphate). The extractant TBP contains 10% kerosene for better phase disengagement. The chloride concentration in the aqueous solution is about 5 N.

For separating the zinc, 10 l of the solution are treated continuously with 7.5 l of the extractant in a four-stage mixer-settler apparatus. In the liquid-liquid extraction $FeCl_3$ is largely transferred together with Zn into the organic phase. The solution of $NiCl_2/CoCl_2$ leaving the last separating vessel contains less than 0.02 g/l Zn and less than 0.01 g/l Fe. The percentages of Ni, Co and Mn remain unchanged.

The organic phase absorbed approximately 7.8 g/l. Elution of the extractant is effected with $H_2O$ and permits the Zn content of the extract to be increased to two to three times the concentration of Zn in the original solution.

Subsequently, the Co contained in the Co/Ni solution (raffinate) is separated as ($CoCl_4^-$) anion by liquid-liquid extraction with the aid of an alkylamine. A 0.6 molar solution of triisononylamine in an aromatic hydrocarbon as diluent (Shellsol AB, for instance) with an addition of 3% TBP is used as extractant. The extraction of Co is accomplished in a five-stage counterflow apparatus with mixer-settler units at 20°-25° C and in a phase ratio A:0 = 1. Compared with the original content, a small amount of Mn is transferred into the organic phase together with Co.

The raffinate resulting from the extraction process is a $NiCl_2$ solution containing 46.2 g/l Ni, less than 0.02 g/l Co and 0.04 g/l Mn. The Co charge of the solvent amounts to approximately 4.1 g/l Co with 0.02 g/l Mn as attendant element.

Elution of the extractant is effected with $H_2O$. A considerable enrichment of the eluate with $CoCl_2$ can be achieved by multi-stage counterflow extraction.

What is claimed is:

1. A method for processing crushed raw manganese nodules for the selective recovery of metal values of nickel, copper, cobalt and zinc contained therein, by predominantly hydrometallurgical means, comprising:
a. suspending the crushed raw nodules in water or dilute wash solution to form a suspension;
b. charging the suspension and sulfuric acid to a pressure vessel to provide an acidified solid-liquid suspension;
c. heating the solid-liquid suspension in the pressure vessel to a temperature between about 150° C and about 300° C to cause the nickel, copper, cobalt and zinc to be selectively leached from the nodules to form a metal rich leach solution containing these metals and a residue, with the solid-liquid suspension having a sulfuric acid content of less than 35 g/l upon completion of the leaching;
d. separating the metal rich leach solution containing nickel, copper, cobalt and zinc from the residue; and
e. recovering the nickel, copper, cobalt and zinc values from the separated metal rich leach solution.

2. The method as defined in claim 1, wherein the recovery of the copper from the separated metal rich leach solution comprises contacting the separated metal rich leach solution with a copper specific organic solvent extractant to form an organic phase containing the copper and an aqueous raffinate, and separating the organic phase from the aqueous raffinate.

3. The method as defined in claim 2, wherein hydrogen sulfide is introduced into the separated raffinate at a pH of between about 0.5 and 2.5, at a temperature of between about 50° C and 150° C, and at a pressure of between about 2 and 20 atmospheres, to precipitate the sulfides of nickel, cobalt and zinc from the raffinate, and the precipitate is filtered out and dissolved in dilute hydrochloric acid at a temperature of between 50° C and 100° C.

4. The method as defined in claim 3, wherein the hydrogen sulfide produced from the dissolution of the sulfide precipitate in the hydrochloric acid is recycled and utilized for further sulfide precipitation.

5. The method as defined in claim 3, wherein the pure metals nickel, cobalt and zinc or their oxides, respectively, are recovered from the hydrochloric acid solution.

6. The method as defined in claim 5, wherein the metal values zinc and cobalt in the hydrochloric acid solution are commonly separated by an organic solvent extractant, and then zinc and cobalt are obtained in the form of a mixed oxide by spray roasting the chloridic zinc and cobalt containing strip solution.

7. The method as defined in claim 6, wherein the organic extractant is a tertiary amine.

8. The method as defined in claim 6, wherein the mixed oxide obtained by spray roasting the chloridic zinc and cobalt containing strip solution, is processed in a furnace under reducing conditions to obtain pure cobalt metal and pure zinc oxide which can be collected in filter bags in the form of flue dust.

9. The method as defined in claim 6, wherein pure nickel oxide is obtained by spray roasting the chloridic raffinate solution that remains after the common zinc and cobalt extraction.

10. The method as defined in claim 5, wherein the metal values zinc and cobalt in the hydrochloric acid solution are selectively separated by organic solvent extractants.

11. The method as defined in claim 10, wherein the organic extractants used are tributyl phosphate for zinc extraction and a tertiary amine for cobalt extraction.

12. The method as defined in claim 10, wherein zinc and cobalt are obtained in the form of pure oxides by individually spray roasting the chloridic strip solution from zinc extraction and the chloric strip solution from cobalt extraction.

13. The method as defined in claim 10 wherein pure nickel oxide is obtained by spray roasting the chloridic raffinate solution that remains after the selective zinc and cobalt extractions.

14. The method as defined in claim 3, wherein the hydrogen sulfide has hydrogen mixed in it.

15. The method as defined in claim 2, and further including passing the separated aqueous raffinate over a selectively acting fixed-bed cation exchanger to separate nickel, cobalt and zinc from the raffinate and fix them to the exchanger and form an effluent solution which leaves the exchanger, and eluting the charged exchanger with dilute hydrochloric acid to form an eluate containing nickel, cobalt and zinc.

16. The method as defined in claim 15, wherein the pure metals nickel, cobalt and zinc or their oxides, respectively, are recovered from the hydrochloric acid eluate of the fixed-bed cation exchanger.

17. The method as defined in claim 15, and further including treating the effluent solution resulting from the passing of the raffinate through the fixed-bed exchanger at a pH of 7 to 10 with milk of lime and air to form a residue, separating this residue from the effluent solution, and dumping this residue as well as the residue of the pressure leaching present after process step (d) of claim 1.

18. The method as defined in claim 15, wherein cobalt (III) hydroxide is precipitated out from the hydrochloric acid eluate of the fixed-bed cation exchanger, the cobalt (III) hydroxide is separated from the eluate, and after separation of the cobalt hydroxide, the nickel and zinc are precipitated out from the eluate.

19. The method as defined in claim 3, wherein the nickel, cobalt and zinc are precipitated at a pH of 1.5 and a temperature of 120° C, and the precipitate is dissolved in dilute hydrochloric acid at a temperature of 90° C.

20. A method for processing raw manganese nodules for the selective recovery of nickel, copper, cobalt and zinc values contained therein, by predominantly hydrometallurgical means, comprising:
a. suspending the raw nodules, which have been comminuted to particle sizes less than 10 mm, in water or dilute wash solution;
b. charging the suspension and sulfuric acid to a pressure vessel to provide an acidified solid-liquid suspension;
c. heating the solid-liquid suspension in the pressure vessel to a temperature between about 150° C and 300° C for 0.5 to 4 hours to cause the nickel, copper, cobalt and zinc to be selectively leached to form a metal rich leach solution containing these metals and a residue, with the solid-liquid suspension having a sulfuric acid content of less than 35 g/l upon completion of the leaching;
d. cooling the solid-liquid suspension and then filtering the cooled suspension;
e. washing the residue;
f. extracting copper from the filtrate of step (d) with a copper specific organic solvent extractant to form an organic phase containing the copper and an aqueous raffinate and separating the organic phase from the aqueous raffinate;

g. recovering the copper from the separated organic solvent extractant; and h. recovering the nickel, cobalt and zinc values from the separated metal rich leach solution.

21. A method for processing raw manganese nodules for the selective recovery of nickel, copper, cobalt and zinc values contained therein, by predominantly hydrometallurgical means, comprising:

a. suspending the raw nodules, which have been comminuted to particle sizes less than 10 mm, in water or dilute wash solution;

b. charging the suspension and sulfuric acid to a pressure vessel to provide an acidified solid-liquid suspension;

c. heating the solid-liquid suspension to a temperature between about 150° C and 300° C for 0.5 to 4 hours to cause the nickel, copper, cobalt and zinc to be selectively leached to form a metal rich leach solution containing these metals and a residue, with the solid-liquid suspension having a sulfuric acid content of less than 35 g/l upon completion of the leaching;

d. cooling the solid-liquid suspension and then filtering the cooled suspension;

e. washing the residue;

f. extracting copper from the filtrate of step (d) with a copper specific organic solvent extractant to form an organic phase containing the copper and an aqueous raffinate and separating the organic phase from the aqueous raffinate;

g. recovering the copper from the separated organic solvent extractant;

h. passing the separated aqueous raffinate over a selectively acting fixed-bed cation exchanger to separate nickel, cobalt and zinc from the aqueous raffinate and fix them to the exchanger and to form an effluent solution which leaves the exchanger;

i. eluting the charged exchanger with dilute hydrochloric acid to form an eluate containing nickel, cobalt and zinc;

j. precipitating cobalt (III) hydroxide from the hydrochloric acid eluate by simultaneously introducing gaseous chlorine and adding milk of lime;

k. filtering the resulting cobalt (III) hydroxide out to form a cobalt-free filtrate, and calcining the filtered cobalt (III) hydroxide;

l. mixing the cobalt-free filtrate with milk of lime at a pH of 6.5 to 8 to precipitate out nickel and zinc;

m. separating the nickel and zinc precipitate and then calcining and pyrometallurgically reducing the separated nickel and zinc precipitate to obtain nickel as a metal and zinc as an oxide;

n. treating the effluent solution resulting from the passing of the aqueous raffinate through the fixed-bed exchanger, at a pH of 7 to 10, with milk of lime and air to form a residue;

o. separating the resulting residue of step (n) from the effluent solution and dumping this residue and the residue of the pressure leaching present after process step (d) of claim 1.

22. The method as defined in claim 21, wherein the comminuted nodules are suspended in wash solution obtained from washing of the leach residue.

23. The method as defined in claim 21, wherein the sulfuric acid content of the solid-liquid suspension is between 8 and 15 g/l upon completion of the leaching.

24. The method as defined in claim 21, wherein the copper specific organic solvent extractant is an oxime or derivative of 8-hydroxyquinoline.

25. The method as defined in claim 21, wherein the copper in the organic solvent extractant is stripped with an aqueous solution of sulfuric acid, and the copper in this solution is then subjected to an electrolytic reduction to obtain pure cathode copper.

26. The method as defined in claim 21, wherein the fixed-bed ion exchanger contains amino carbon acid groups or iminodicarbon acid groups.

27. The method as defined in claim 21, wherein the gaseous chlorine and milk of lime are added at a pH of about 3.8 to 4.

28. The method as defined in claim 21, wherein after calcining the cobalt (III) hydroxide, it is reduced to cobalt metal.

* * * * *